United States Patent Office 3,561,280
Patented Feb. 9, 1971

3,561,280
THREE AXIS STRAIN GAGE CONTROL DEVICE
John MacPhee, Rowayton, Conn., and Edgar R. Lodi, York, Pa., assignors to American Machine and Foundry Company, a corporation of New Jersey
Filed Oct. 23, 1968, Ser. No. 769,831
Claims priority, application Great Britain, Aug. 22, 1968, 40,205/68
Int. Cl. G05g 9/00; B64c 13/04
U.S. Cl. 74—471                                1 Claim

ABSTRACT OF THE DISCLOSURE

A control device which translates a force applied to a member into signals representative of the X, Y and Z components of the force applied to the member, the signals being generated by strain gages coupled to sense the application of the force applied to the member along the various axes.

---

Figure 1:
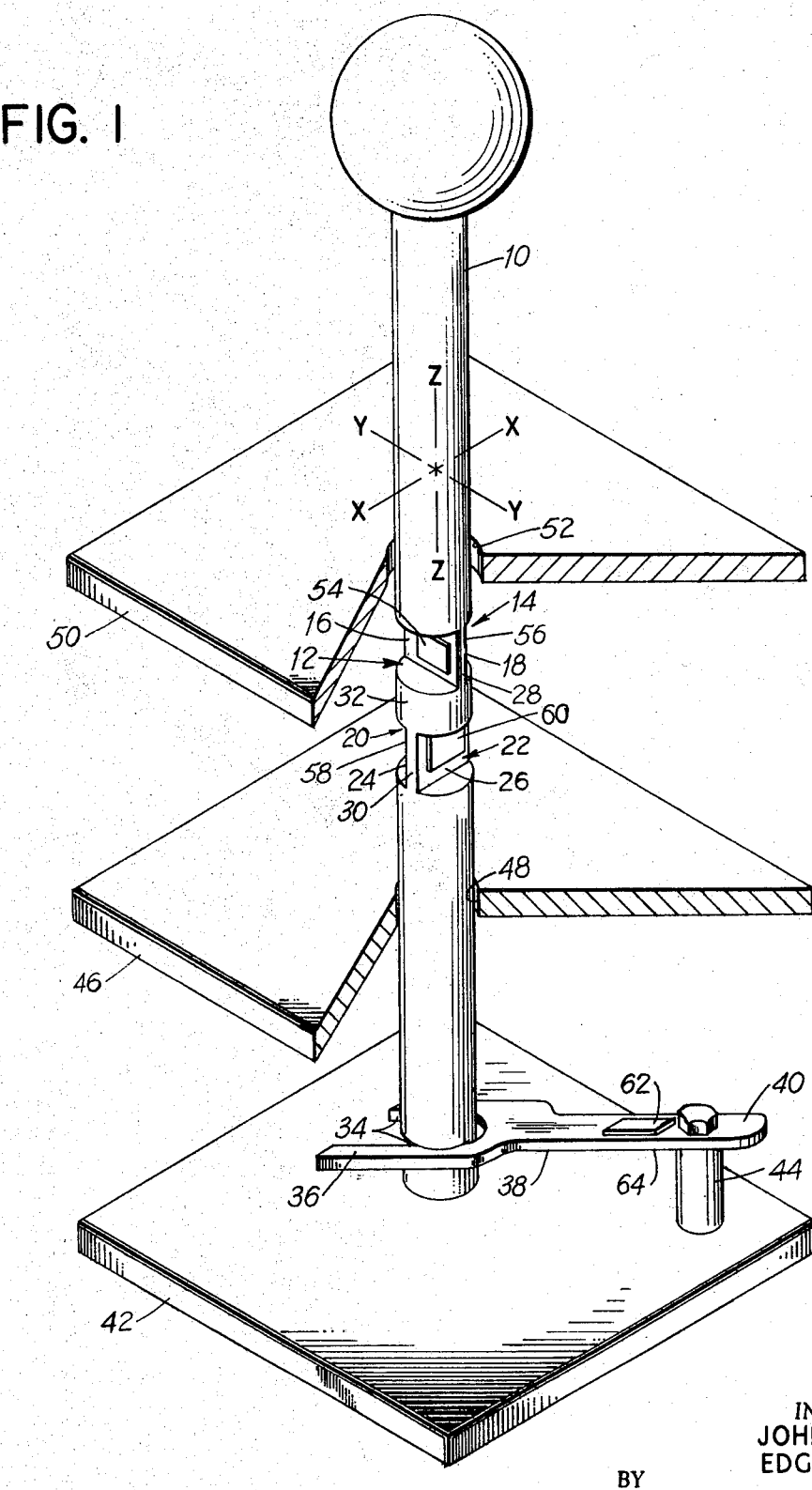

This invention relates generally to a control device and more particularly to a control device which can translate a physical displacement such as a shaft moved by an operator's hand into signals representative of three degrees of movement.

Automatically controlled mechanisms have been developed to simulate certain movements of the human arm and hand. These mechanisms are commonly referred to as remotely controlled handling equipment, programmed manipulators, robots and the like. In operation, the mechanisms duplicate the manipulative skill of the human arm in its ability to reorient or reposition an object under the constant control of a remotely positioned person or suitably designed mechanical, electrical or similar memory or programming devices.

The work handling machine or remotely controlled device disclosed in U.S. Pat. 3,212,649, by H. T. Johnson et al., entitled "Machine for Performing Work," has great flexibility and versatility in carrying out both simple and complex movements and operations. In the device described in U.S. Pat. 3,212,649 a pair of grippers in the nature of a jaw can be opened, closed, rotated and turned in a wrist like action. The grippers are mounted on a horizontal arm which in turn is mounted on a vertical column through a carriage. The horizontal arm is free to move axially in the carriage and the carriage is free to move vertically on the column. In addition to the horizontal and vertical movements, the column is free to rotate through a substantial angle on its base. Thus, the three basic degrees of freedom are horizontal motion, vertical motion and swinging motion of the grippers and supporting arm; and the opening and closing of the grippers and the wrist like rotation and pivoting of the grippers constitute limited modes of freedom.

In the particular work handling machine described in U.S. Pat. 3,212,649, a hydraulic system drives the machine through all its motions. In the three basic degrees of freedom—horizontal, vertical and swing displacement of the arm, movement of the arm is controlled by hydraulic valves which are electrically actuated from servo amplifiers. Resolvers are coupled to mark the position of the arm for each of the three displacements. The resolvers provide an output signal which can be used while the device is being programmed to record signals on to a tape for subsequent playback. During operation from a recorded program, a signal from a recorded tape is compared with a signal from a resolver associated with each of the three displacements. The difference between the recorded signal and the resolver signal is the error signal which is utilized to drive the arm. Movement of the arm alters the output signal of the associated resolver until the error signal is nulled.

To initiate the operation of the machine, control structure must be provided to generate control signals representative of the horizontal, vertical and swing displacements of the arm. Simplified and accurate generation of the several control signals is essential to permit the arm to be moved through space along the path desired. As the several control signals are generated to drive the arm along the path desired, the movements of the arm can be recorded by means of signals generated by resolvers or pots driven by the arm itself and recorded on tape or other medium to provide a permanent record of the path traversed.

It is an object of this invention to provide a manually controlled device which can generate control signals for driving a machine for performing work.

It is also an object of this invention to provide a device that generates signals representative of three degrees of movement from a single control lever.

It is another object of this invention to provide a device that is economical to build and reliable in operation.

Figure 2:
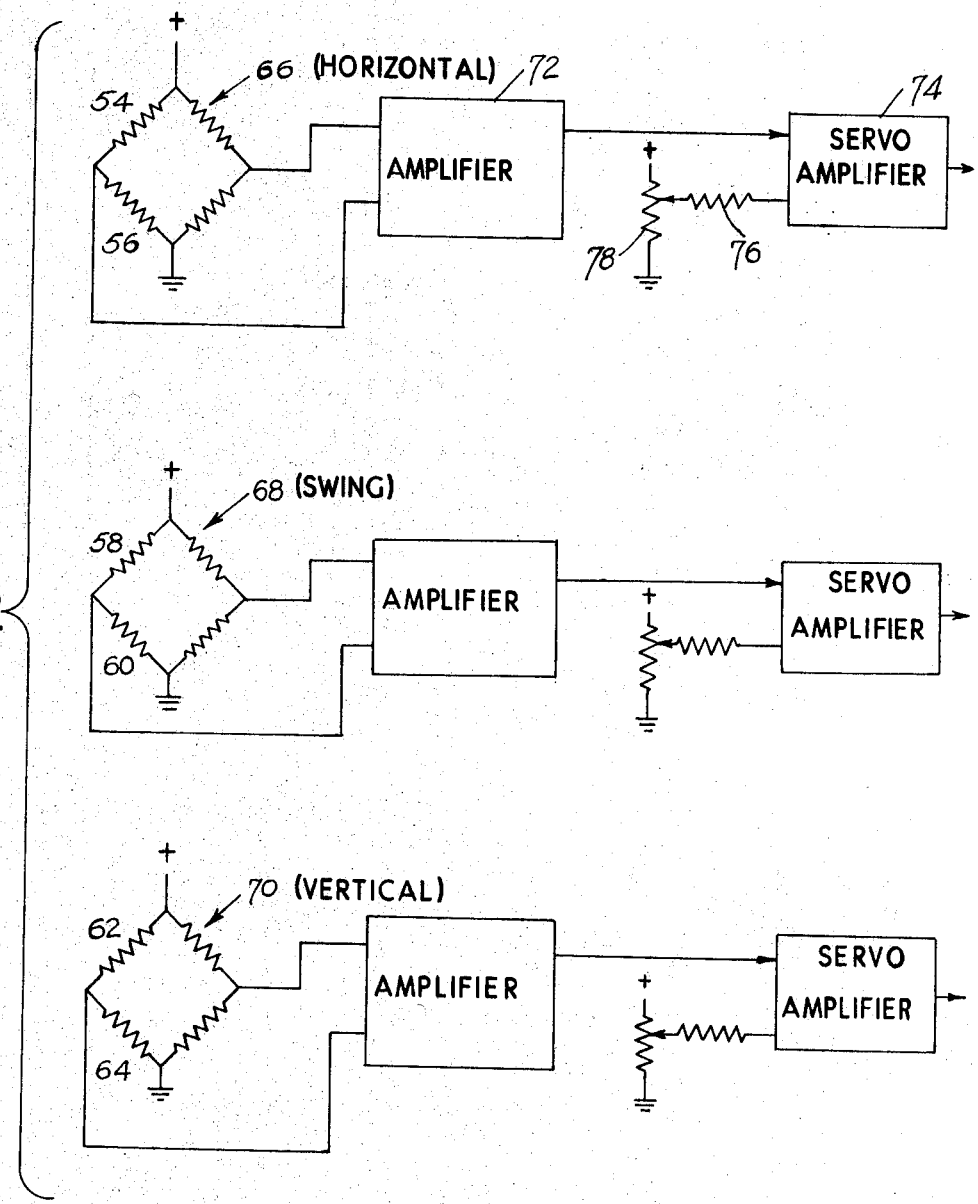

Other objects and many of the attendant advantages of this invention will be readily appreciated as the same becomes better understood by reference to the following detailed description when considered in connection with the accompanying drawings wherein:

FIG. 1 is a view of structure in accordance with the principals of this invention; and
FIG. 2 is a diagram of the electrical control network associated with the structure of FIG. 1.

Referring to FIG. 1, shaft 10 which can be composed of mild cold rolled steel or the like and having a diameter of approximately one-half of an inch contains a first cutout or reduced area 10 and a second cutout or reduced area 14, the cutouts 12, 14 being positioned opposite each other to form two opposed flat surfaces 16, 18.

Positioned below and at right angles to the first and second cutouts 12, 14 there is a third cutout or reduced area 20 and a fourth cutout or reduced area 22, the cutouts, 20, 22 being positioned opposite each other to form two opposed flat surfaces 24, 26. The web 28 formed by the two opposed flat surfaces 16, 18 and the web 30 formed by the two opposed flat surfaces 24, 26 are each approximately one-quarter of an inch in thickness; and the spacing of the member 32 occurring between the cutouts 12, 14 and the cutouts 20, 22 is approximately one-quarter of an inch in thickness.

Positioned at the lower end of the shaft 10 are two opposed cutouts or slots 34 sized to accommodate a bifurcated end 36 of a cantilevered strap member 38.

The other end 40 of the member 38 is secured rigidly to a bottom plate 42 by means of a nut and bolt and maintained spaced from the plate by a spacer 44.

The member 38 can be composed of cold rolled steel having a thickness of approximately one-eighth of an inch and being about one half an inch in width at its end 40.

The cantilevered strip member 38, acting through the engagement of the bifurcated end with the slots 34, prevents the shaft 10 from rotating about its longitudinal axis in addition to functioning as a support for the shaft 10, the bottom of the shaft 10 being positioned above and spaced from the bottom plate 42. Thus, the shaft 10 is free to move up or down against the retarding action of the strap member 38 in response to a vertical force being applied to the shaft, and is constrained from rotation about its longitudinal axis by the cantilevered strip member 38 engaging the slots 34 within the shaft 10.

An intermediate member 46 which can be a flat plate supports a circular cutout 48 sized to slidably accommodate the shaft 10.

The top member 50 which can be a flat plate supports a circular cutout 52 sized to freely accommodate with liberal clearance the shaft 10.

The bottom plate 42, the intermediate plate 46 and the top plate 50 are maintained in position relative to each other such that the intermediate plate is positioned between the member 38 and the cutouts 20, 22; the top plate 50 being positioned above the cutouts 12, 14, and the shaft 10 being free to slide up and down within the cutout 48 and to wobble freely around within the oversized cutout 52.

The member 38 yieldably supports the shaft 10, the bottom end of the shaft 10 being positioned a distance above the bottom plate 42 sufficient to permit the shaft to be urged downward.

Positioned within cutout 12 and secured to the flat surface 16 of the shaft 10 is a strain gage 54 which can be of the SR–4 type manufactured by BLH Electronics, Inc. Opposite strain gage 54 within cutout 14 and secured to the flat surface 18 of the shaft 10 is a strain gage 56 such as the SR–4 type manufactured by BLH Electronics, Inc. which cooperates, in a bridge network, with strain gage 54.

In a similar manner strain gages 58, 60 which can be of the SR–4 type manufactured by BLH Electronics, Inc. secured to the flat surfaces 24, 26 within the cutouts 20, 22 of the shaft 10.

Positioned on the top surface of the cantilevered strap member 38 is a strain gage 62 which can be of the SR–4 type manufactured by BLH Electronics, Inc.; and, aligned with the strain gage 62 and secured to the bottom surface of the member 38 is a strain gage 64 which can also be of the SR–4 type manufactured by BLH Electronics, Inc.

Referring specifically to FIG. 2, the strain gages 54, 56 are connected into a bridge network 66 for controlling displacement along a first axis of an actuator arm of a remotely controlled device such as that disclosed in U.S. Pat. 3,212,649.

The strain gages 58, 60 are connected into a bridge network 68 for controlling displacement along a second axis of the actuator arm of the remotely controlled device such as that disclosed in U.S. Pat. No. 3,212,649.

The strain gages 62, 64 are connected into a bridge network 70 for controlling displacement along a third axis of the actuator arm of the remotely controlled device such as that disclosed in U.S. Pat. No. 3,212,649.

The device here disclosed can be mounted directly to the member being controlled, or it can be mounted at some position remote from the member being controlled. For purposes of illustration it shall be assumed that the device here disclosed is mounted onto the actuator arm of the remotely controlled device, the base plate 42 being secured by bolts or the like to a side of the actuator arm and oriented to position vertically the longitudinal axis of the shaft 10. Additionaly, shaft 10 is oriented to have its X—X axis positioned parallel to the longitudinal axis of the actuator arm of U.S. Pat. No. 3,212,649.

When oriented in this position, the strain gages 58, 60 and, therefore, bridge network 68 controls swing displacement of the actuator arm; the strain gages 62, 64, and, therefore, bridge network 70 controls vertical displacement of the actuator arm; and, strain gages 54, 56 and, therefore, bridge network 66 controls horizontal displacement of the actuator arm.

Referring specifically to the circuit for the horizontal displacement of the actuator arm of FIG. 2, the strain gages 54, 56 are connected in the bridge network 66. The at rest resistance of the SR–4 type strain gage manufactured by BLH Electronics, Inc. is typically 120 ohms. Therefore, each of the resistors in the bridge network has a value of approximately 120 ohms. A five volt DC signal is fed to an input terminal of the bridge, the other terminal being connected to ground. The output of the bridge network 66 is fed to an amplifier 72 which can be similar to a Fairchild 709 type amplifier. The signal from the amplifier 72 is fed to one input of a servo amplifier 74 the output of the servo amplifier being coupled to drive a servo valve or the like. The other input of the servo amplifier 74 is coupled through a 1000 ohm resistor 76 to a potentiometer 78. The potentiometer 78 provides the second input for the servo amplifier 74 against which the output of the amplifier 72 is matched. The potentiometer is adjusted to provide a signal equal to the signal from the amplifier 72 when the strain gages are relaxed. In this manner, the bridge network can be brought to a balanced condition regardless of small differences which may exist between the values of the various resistors of the bridge. The signal from the servo amplifier 74 is at a minimum when the signal from the potentiometer 78 is equal to the signal from the amplifier 72. Thus, the servo amplifier 74 will generate a signal during those periods when the strain gages 54, 56 are strained and cause the bridge network to become unbalanced.

In operation, the structure here disclosed can be substituted for the programming mechanism of the structure of the machine for performing work disclosed in U.S. Pat. No. 3,212,649.

Movement of the shaft 10 of this invention will cause a signal to be generated which will control the operation of the servo valves and urge the arm to move in a desired direction to a desired position.

Applying hand pressure to the knob positioned at the very top of the shaft 10 in a direction perpendicular to the longitudinal axis of the shaft 10 will change the value of the strain gages 54, 56 and/or 58, 60; the direction of movement of the shaft 10 determining which pairs of strain gages are affected. For example, if the shaft 10 is moved along the X—X axis, only then the strain gages 54, 56 will be affected as the shaft flexes about the web 28. In a similar manner, if the shaft 10 is moved along the Y—Y axis only, then only the strain gages 58, 60 will be affected as the shaft flexes about the web 30. However, if the shaft 10 is moved along a direction that falls between both the X—X axis and the Y—Y axis, then both sets of strain gages 54, 56 and 58, 60 will be affected as the shaft will flex about each of the webs 28 and 30.

In a similar manner, applying a force to the shaft 10 along its longitudinal axis, the cantilevered strap member 38 is flexed and the value of the strain gages 62, 64 are affected.

It is to be noted that there is relatively complete isolation between the three axes. That a force applied to the shaft 10 along its longitudinal or Z—Z axis does not affect the value of the strain gages which represent the X—X axis or the Y—Y axis. Similarly, a force applied to the shaft along the X—X axis will not affect the value of the strain gages which represent the Y—Y axis or the Z—Z axis; and, a force applied to the shaft along the Y—Y axis will not affect the value of the strain gages which represent the X—X axis or the Z—Z axis.

The cutout 48 in the plate 46 is sized to permit the shaft 10 to slide freely up and down; and, the cutout 52 in the plate 50 is sized to permit the shaft to be wobbled freely back and forth within the cutout 52.

Obviously many modifications and variations of the present invention are possible in the light of the above teachings. It is, therefore, to be understood that within the scope of the appended claim the invention may be practiced otherwise than as specifically described herein.

What is claimed is:

1. In a controlled handling equipment wherein a member is controllably movable in three transverse directions, apparatus including a manually operated control device for producing three control signals for moving said member in the respective directions in response to corresponding movement of the control device, said apparatus comprising:
- a shaft movable axially in a first direction that corresponds to one of said transverse directions,
- said shaft being independently flexible in each of two directions that are transverse to each other and to said first direction, said two directions corresponding to the second and third transverse directions,
- means prohibiting the total displacement of said shaft in either of said two directions but permitting the shaft to flex in each of said two directions,
- a yieldable cantilevered member secured at one end to a support and at its other end to said shaft for permitting axial movement of the shaft in response to a force applied axially thereto,
- strain gage means attached to the canilevered member to provide an electrical control signal representative of the axial position of the shaft,
- second and third strain gage means attached to said shaft for producing respective electrical signals representative of the independent flexing movement of said shaft in said two directions.

References Cited
UNITED STATES PATENTS

| | | | |
|---|---|---|---|
| 2,597,751 | 5/1952 | Ruge | 201—63 |
| 2,866,333 | 12/1958 | Dudenhausen | 73—141 |
| 3,168,826 | 2/1965 | Paetow | 73—141 |
| 3,447,766 | 6/1969 | Palfreyman | 244—83 |

RICHARD C. QUEISSER, Primary Examiner

J. WHALEN, Assistant Examiner

U.S. Cl. X.R.

73—141; 74—519; 244—83